UNITED STATES PATENT OFFICE.

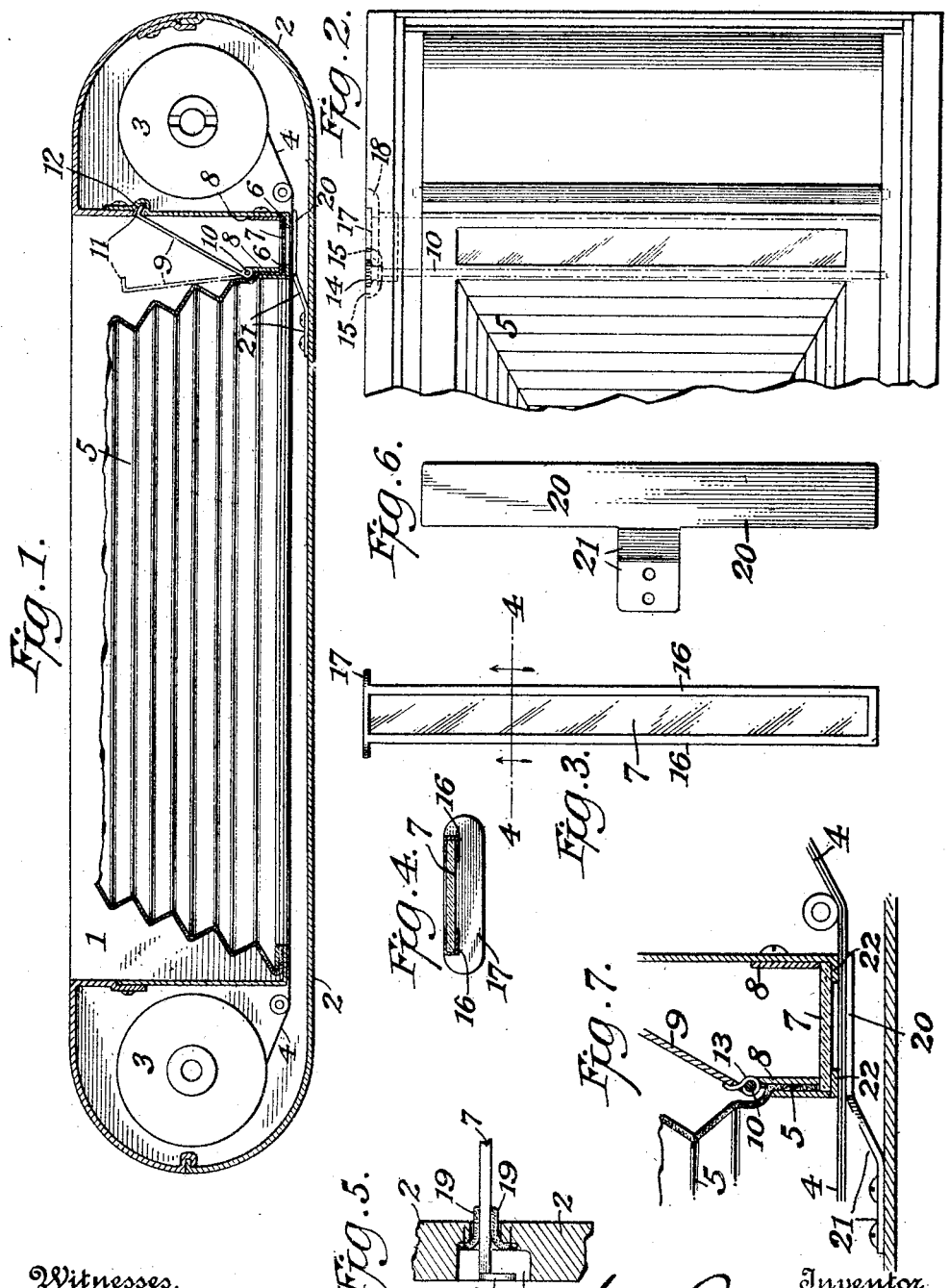

CARL BORNMANN, OF BINGHAMTON, NEW YORK, ASSIGNOR TO ANSCO COMPANY, OF BINGHAMTON, NEW YORK, A CORPORATION OF NEW YORK.

CAMERA.

1,365,083. Specification of Letters Patent. Patented Jan. 11, 1921.

Application filed March 8, 1915. Serial No. 12,757.

*To all whom it may concern:*

Be it known that I, CARL BORNMANN, a citizen of the United States, and a resident of the city of Binghamton, county of Broome, and State of New York, have invented a new and useful Improvement in Cameras, of which the following is a specification.

It is the purpose of this invention to provide the camera with compact, simple and practically automatically acting devices adapted to make the desired autographic record and that they shall be entirely inclosed within the body of the camera; also that by a slight, easily made modification in the construction of the bellows, space may be provided for the autographic devices without increasing the size of the camera; also that there shall be no parts projecting beyond the outer surface of the camera liable to become deranged or injured by contact with other objects; and which shall make the record upon the most desirable part of the negative, that is to say in the otherwise waste space between exposures. The construction is such that it will be practically impossible to fog the plate and certain mechanical advantages are secured.

In the drawings Figure 1 is a longitudinal sectional view of a camera of the well known folding type taken through its medial line; Fig. 2 is a plan view of the end of the camera showing the parts involved in this invention, the film spool, film and the shutter for the autographic devices being removed; Fig. 3 is a plan view of the autographic plate disassociated from the other parts; Fig. 4 is an enlarged sectional view, partly in elevation, of that which is shown in Fig. 3, on the line 4—4 of that figure, looking in the direction of the arrows; Fig. 5 is a vertical sectional view, partly in elevation, of the outer end of the autographic plate; Fig. 6 is a plan view of the spring which presses the film against the frame for the focal plane; Fig. 7 is a sectional view, partly in elevation, of a modified construction.

In the drawings, 1 represents the camera body, 2 the back thereof, 3, 3, the film spools, 4 the film, 5 the bellows. These parts are or may be of any preferred construction.

The parts immediately involved in the invention are as follows:

At one side of the bellows running transversely of the camera there is built in a little frame 6, 6, see Fig. 1, which is in, or close to the focal plane. 7 is the autographic plate, which slides under the overhanging flanges of the frame 6 and inside of the frame 6 there is another frame, 8, 8, the purpose of which is to secure the frame 6, which carries the autographic plate, and one of its sides serves as a support for an oscillating shutter 9, the axis 10 of which is supported upon it as shown. The free end 11 of this shutter is adapted to fold within a recess 12 made in the adjacent wall of the adjacent spool chamber and a spring 13 (see Fig. 7) surrounds the axis 10 of the oscillating shutter 9, so that it is normally swung forwardly into the closed position shown in full lines in Fig. 1. The axis 10 of the shutter projects through the wall of the camera and has a knurled thumb button or knob 14 on its outer end which is received within a recess or cup 15 set in the side of the camera, so that while easily accessible to the fingers of the operator, its outer surface will be flush, or substantially so with the side of the camera, so that there will be no projecting parts.

The autographic plate upon which the record is written may be a piece of glass, roughened celluloid, mica, or equivalent material of any shape upon which writing may be readily produced and from which it can be readily removed. Such a plate made of glass is shown in Fig. 7, but I prefer to make it as illustrated in Figs. 3 and 4, in which the plate 7 is seen to be in the form of a long narrow strip adapted to endwise insertion and removal from the attachment. In the example shown it is inclosed within a suitable frame 16 provided with a laterally projecting flange 17 at its outer end, whereby it may be readily grasped and pulled outwardly, the frame and the flange being preferably made of thin metal. This flange 17 (see Figs. 2 and 5) is inclosed within an elongated cup or recess 18 set into the outside of the camera, so that the flange 17 will be flush, or substantially so, with its exterior surface, the same as the knob 14 on the end of the axis of the shutter.

In order that the passage of light into the camera may be prevented upon the withdrawal of the autographic plate for the production of the record thereon, or the removal of a spent record therefrom, I provide the opening in the camera through which it is introduced, with light-excluding material 19, 19. This is preferably flexible, and elastic, or at least compressible material, such as felt, adapted to automatically close the opening and exclude the light upon the withdrawal of the plate and to yield for its reinsertion. This material of course extends across the entire opening from side to side and preferably around the corners thereof as well, so as to effect perfect closure of the opening in the event of the withdrawal of the plate. In order that the film may be pressed close up against the plate-carrying frame, which is likewise the focal frame, in other words, as close as possible to the autographic plate, I provide a spring 20 (see Figs. 1 and 6) supported upon a resilient bracket 21 attached to the back of the camera. The spring is preferably substantially as long as the autograph plate.

In Fig. 7 I show an alternative construction in which the frame 6 illustrated in the other figures, and which carries the autographic plate, is eliminated, the plate 7 sliding within the space between thin transverse bars or plates 22, 22, at the focal plane and the edges of the shutter-supporting frame 8, 8. This construction is somewhat simpler and is as desirable as the other.

The operation is as follows:

When it is desired to make no record, the parts are left in their normal condition and the camera is used in the usual manner as though the autographic appliances were not present; when, however, a record is desired, the operator by means of the flange 17 at the end of the autographic plate 7 pulls the same outwardly away from the camera and makes thereon such record and at such part of the plate as desired. If it is a long record, it may extend entirely across the plate; if shorter, it may be located near one end or the other or in the middle as preferred. During the extraction of the plate the flexible or at least compressible light-excluding material 19 automatically precludes the entrance of light. The autograph being produced upon the plate, it is again pushed inwardly, the light-excluding devices automatically yielding thereto. Thereupon to produce the record, which may be made either before or after the main exposure through the regular camera lens, the operator, by appropriate manipulation of the thumb nut 14 on the end of the axis 10 of the shutter 9, swings the shutter into its open position as shown in dotted lines in Fig. 1, thus admitting the light for the requisite period and when he releases the thumb nut the spring 13 will instantly close the shutter, thus cutting off the supply of light. It will also be noted that the spring 20 will press the film snugly against the outer side of the frame for the autographic plate, thus securing proper production of the record thereon and likewise preventing the spread of the light to any portion of the negative other than the desired area.

It will be noted that by my invention I secure a series of advantages, some of which have been realized before, and some of which are new with me. The advantages are as follows:

(a). The autographic record once written can be used upon an indefinite number of exposures by merely opening and closing the shutter to admit light at the appropriate times.

(b). The light is co-extensively admitted throughout the entire autographic plate at the same moment, thus insuring even exposure and consequent uniform production of the autograph.

(c). The aperture through which the light passes to photograph the record upon the film is at one end of the focal plane frame and the arrangement of the parts is preferably such that the size of the camera will not be increased.

(d). The record is made upon the negative in the most desirable place, i. e., in the usually waste section between exposures.

(e). The record, if short, may be located at the most approved place upon the end of the negative, that is to say, near either corner or in the center.

(f). No special make of film nor any carbon paper nor any other peculiar construction is necessary.

(g). All parts of the apparatus are flush with the exterior surface of the camera, therefore not liable to injury or accidental manipulation.

(h). All of the parts are automatic in their action, thus avoiding accidental fogging of the plate, that is to say, upon the withdrawal of the record plate, the light-excluding devices described will automatically close the opening, thus precluding the entrance of light, also the shutter for the autographic plate when released automatically closes and cuts off the light, consequently no watchfulness or care is necessary on the part of the operator and lack of skill or carelessness on his part can do no harm.

(i). The tension spring, which is attached to the removable back and which is of course opaque, together with the black paper precludes the passage of light and presses the film against the rear of the focal plane, thus insuring the proper relation between the film and the record bearing plate.

It will be obvious to those who are familiar with such matters that the above description and illustration show two forms only in which the invention may be embodied and that modifications or departures therefrom may be made and still the essentials of the invention be retained. I therefore do not limit myself to the details shown and described.

I claim:

1. A camera having an autographic attachment embodying a long and narrow translucent strip, upon which the record may be initially produced, said strip being arranged transversely of the camera adjacent to the sensitized side of the sensitive element therein and at one edge of the focal field of the camera, and being adapted to endwise movement during insertion and removal from the camera, and means, which control the entrance of light to the strip, separate from and independent of the lens shutter and so constructed and operated that it simultaneously and equally admits light to all parts of the strip.

2. A camera having an autographic attachment embodying a translucent strip, upon which the record may be initially produced, a light-tight chamber extending transversely of the camera adjacent to the focal plane thereof, a slideway for the strip within the said chamber, a shutter, which controls the entrance of light to the strip, so as to simultaneously and equally admit light to all parts of the strip, means to automatically prevent the entrance of light when the strip is removed, all of said devices being within the outer surfaces of the camera and adjoining the sensitized side of the sensitive element, and means to press the film toward the strip.

3. A camera having an autographic attachment embodying a long and narrow translucent strip upon which the record may be initially produced, said strip being arranged transversely of the camera adjacent to the sensitized side of the sensitive element therein and at one edge of the focal field of the camera, and being adapted to endwise movement during insertion and removal from the camera, and means closely adjacent to the strip which control the entrance of light to and through the same, said means being separate from and independent of the lens shutter and so constructed and operated that it simultaneously and equally admits light to all parts of the strip.

In testimony whereof I have signed my name to this specification in the presence of two subscribing witnesses.

CARL BORNMANN.

Witnesses:
HENRY F. MEEHAN,
ERNEST W. SCHULTZ.